US008565084B2

(12) United States Patent
Castillo et al.

(10) Patent No.: US 8,565,084 B2
(45) Date of Patent: Oct. 22, 2013

(54) METHOD AND APPARATUS FOR ADAPTIVE DATA RATE DETERMINATION IN A WIRELESS COMMUNICATION NETWORK

(75) Inventors: Alfredo R. Castillo, West Dundee, IL (US); William K. Morgan, Wauconda, IL (US)

(73) Assignee: Motorola Mobility LLC, Libertyville, IL (US)

( * ) Notice: Subject to any disclaimer, the term of this patent is extended or adjusted under 35 U.S.C. 154(b) by 145 days.

(21) Appl. No.: 13/249,274

(22) Filed: Sep. 30, 2011

(65) Prior Publication Data

US 2013/0083659 A1 Apr. 4, 2013

(51) Int. Cl.
*H04W 28/04* (2009.01)

(52) U.S. Cl.
USPC .......................................................... 370/231

(58) Field of Classification Search
USPC .................................. 370/231; 455/242.2, 506
See application file for complete search history.

(56) References Cited

U.S. PATENT DOCUMENTS

| | | | | |
|---|---|---|---|---|
| 5,144,296 A * | 9/1992 | DeLuca et al. | ............... | 340/7.35 |
| 6,438,119 B1 * | 8/2002 | Kim et al. | ...................... | 370/335 |
| 6,469,992 B1 * | 10/2002 | Schieder | ........................ | 370/329 |
| 6,804,224 B1 * | 10/2004 | Schuster et al. | ............. | 370/352 |
| 6,889,347 B1 * | 5/2005 | Adams et al. | ................. | 714/704 |
| 7,126,996 B2 | 10/2006 | Classon et al. | | |
| 7,340,017 B1 * | 3/2008 | Banerjee | ....................... | 375/348 |
| 7,613,977 B2 | 11/2009 | Shiizaki et al. | | |
| 7,616,658 B2 | 11/2009 | Harada et al. | | |
| 2006/0084458 A1 * | 4/2006 | Mammarappallil et al. | .. | 455/522 |
| 2006/0094367 A1 * | 5/2006 | Miyoshi et al. | ............ | 455/67.11 |
| 2007/0206635 A1 * | 9/2007 | Pozhenko et al. | ............ | 370/473 |
| 2008/0220726 A1 | 9/2008 | Gulati et al. | | |
| 2009/0225982 A1 * | 9/2009 | Yener et al. | ...................... | 380/44 |

FOREIGN PATENT DOCUMENTS

| | | |
|---|---|---|
| EP | 1227603 A1 | 7/2002 |
| EP | 1986365 A1 | 10/2008 |
| WO | 2010036519 A1 | 4/2010 |

OTHER PUBLICATIONS

Patent Cooperation Treaty, International Search Report and Written Opinion of the International Searching Authority for International Application No. PCT/US2012/056479, Dec. 4, 2012, 11 pages.
Wikipedia: Rayleigh Fading, Wikipedia, the free encyclopedia, Downloaded from internet Sep. 29, 2011, http://en.wikipedia.org/wiki/Rayleigh_fading, all pages.

* cited by examiner

*Primary Examiner* — Hassan Kizou
*Assistant Examiner* — Tejis Daya
(74) *Attorney, Agent, or Firm* — Gary J. Cunningham

(57) ABSTRACT

A method and apparatus determine an adaptive data rate in a wireless communication network. The method can include: setting (620) a wireless network layer two negative acknowledgement message threshold based on an average fade duration over a frame time; receiving (630) a number of wireless network layer two negative acknowledgement messages at a device over a given period; comparing (640), at the device, the number of wireless network layer two negative acknowledgement messages to the wireless network layer two negative acknowledgement message threshold; requesting (650) a higher data rate if the number of wireless network layer two negative acknowledgement messages is below the wireless network layer two negative acknowledgement message threshold; and requesting (660) a lower data rate if the number of wireless network layer two negative acknowledgement messages is above the wireless network layer two negative acknowledgement message threshold.

18 Claims, 6 Drawing Sheets

METHOD AND APPARATUS FOR ADAPTIVE DATA RATE DETERMINATION IN A WIRELESS COMMUNICATION NETWORK

BACKGROUND

1. Field

The present disclosure is directed to a method and apparatus for adaptive data rate determination in a wireless communication network. More particularly, the present disclosure is directed to adaptive aggressive reverse rate transition for enhanced throughput performance in wireless communication systems.

2. Introduction

Wireless communication devices used in today's society include mobile phones, personal digital assistants, portable computers, gaming devices, and various other electronic communication devices. A wireless communication device communicates wireless signals over a wireless network, such as a Radio Access Network (RAN), such as over a Code Division Multiple Access (CDMA) network, a Time Division Multiple Access (TDMA) network, a Long Term Evolution (LTE) network, a CDMA2000 network, such as a Single Carrier Radio Transmission Technology (1xRTT) network, or any other wireless network.

A wireless communication device operates at different data rates. To operate at a given data rate, the wireless communication device requests the given data rate from the RAN. The wireless communication device determines the given data rate based on the supplemental channel cost and available power budget on the device.

If the device has sufficient power for a given radio condition, it will make the request for a maximum rate allocation. However, if the device transmit power increases due to shadowing or higher path loss, the available power budget will be lower, and therefore the requested data rate should be also lower. For example, if the device transmit power increases due to a large average fade duration (Tz) or higher path loss, the available power budget will be lower, and therefore the requested data rate will degrade and should be lower. The Average Fade Duration (Tz) is the average time that the signal envelope stays below a given target level Z. This target level Z is the power level required for a given performance metric such as bit error rate, Frame error rate, or other performance metric.

However, some devices do not follow this rate allocation principle. As a result, the devices always make the request for maximum data rate regardless of radio conditions, transmit power budget, and other active mobiles in the network. Additionally, new form factors may impact the antenna performance and therefore reduce a device's antenna total radiated power, which adversely impacts the rate request algorithm explained before.

For example, devices make a blind maximum request by always requesting the maximum data rate. Unfortunately, this approach adversely affects the devices performance because it generates power amplifier splatter, increases noise rise, which affects sector capacity, and also increases a packet error rate.

Thus, there is a need for an adaptive data rate determination in a wireless communication network.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus for adaptive data rate determination in a wireless communication network is disclosed. The method can include setting a wireless network layer two negative acknowledgement message threshold based on an average fade duration. The method can include receiving a number of wireless network layer two negative acknowledgement messages at a device over a given period. The method can include comparing, at the device, the number of wireless network layer two negative acknowledgement messages to the wireless network layer two negative acknowledgement message threshold. The method can include requesting a higher data rate if the number of wireless network layer two negative acknowledgement messages is below the wireless network layer two negative acknowledgement message threshold. The method can include requesting a lower data rate if the number of wireless network layer two negative acknowledgement messages is above the wireless network layer two negative acknowledgement message threshold.

Figure 1:
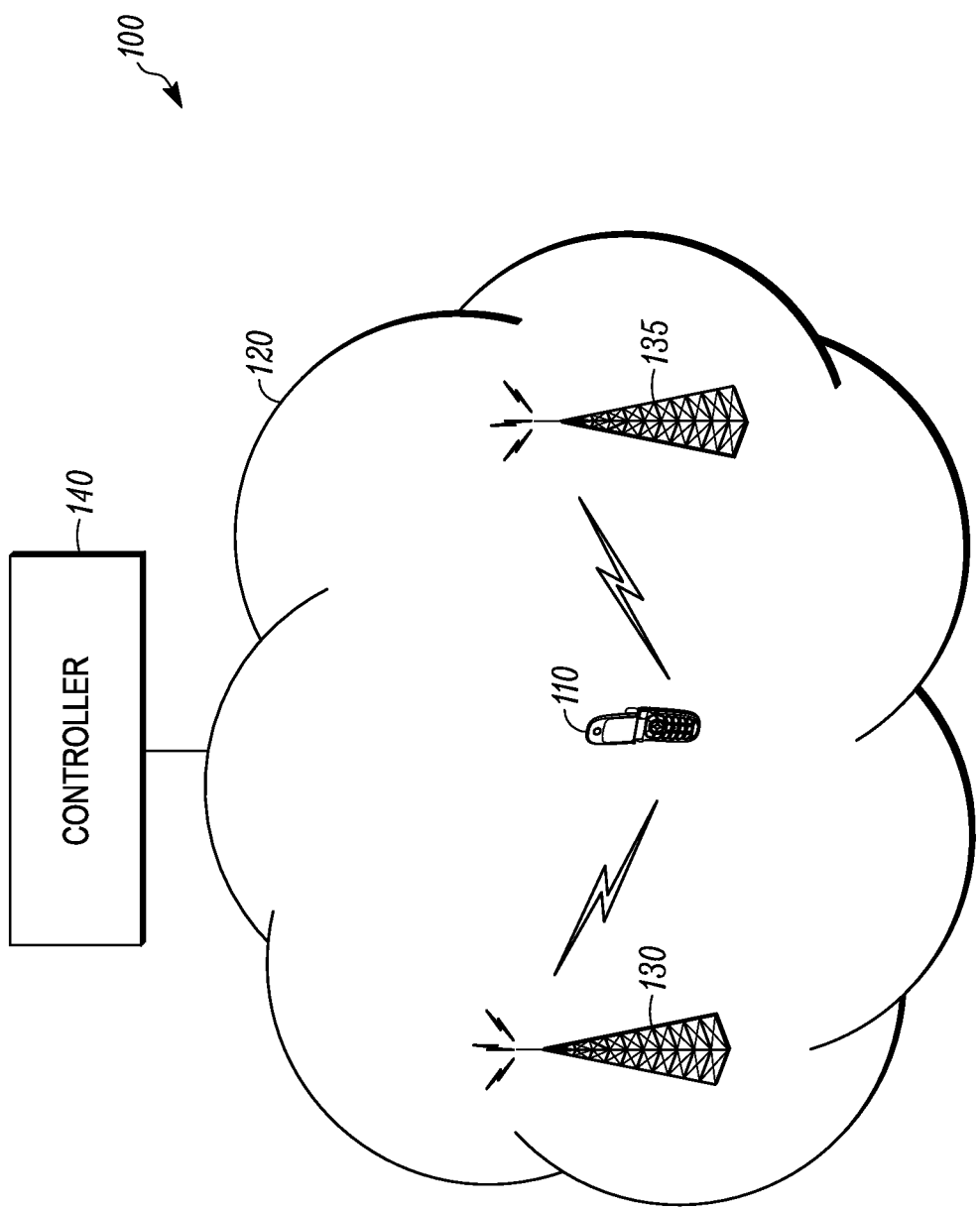
FIG. 1 illustrates an example diagram of a system in accordance with one possible embodiment.

FIG. 1 is an example block diagram of a system 100 according to one possible embodiment. The system 100 can include a terminal 110, a network 120, a first base station 130, a second base station 135, and a network controller 140.

The terminal 110 can be a wireless communication device including cellular and/or other wireless communication circuitry, such as Code Division Multiple Access (CDMA) circuitry, Long Term Evolution (LTE) circuitry, Universal Mobile Telecommunications System (UMTS) circuitry, Time Division Multiple Access (TDMA) circuitry, 802.11-based circuitry, Wi-Fi circuitry, circuitry, Global Positioning System (GPS) circuitry, and/or other wireless communication circuitry. For example, the first portable communication device 110 can be a mobile phone, a personal digital assistant, a personal computer, or any other communication device that allows a user to communicate or perform applications using the terminal 110. As a further example, the terminal 110 can be a wireless communication device, such as navigation device, gaming device, entertainment device, a wireless telephone, a cellular telephone, a personal digital assistant, a pager, a selective call receiver, or any other device that is capable of sending and receiving communication signals on an electronic network. The base stations 130 and/or 135 may be cellular base stations, wireless local area network access points, communications satellites, or any other device that provides access between a wireless device and a network.

In an exemplary embodiment, the network controller 140 is connected to the network 120. The controller 140 may be located at a base station, at a radio network controller, or anywhere else on the network 120. The network 120 may include any type of network that is capable of sending and receiving signals, such as wireless signals. For example, the network 120 may include a wireless telecommunications network, a cellular telephone network, a CDMA network, a LTE network, a UMTS network, a TDMA network, a satellite communications network, and other like communications systems. Furthermore, the network 120 may include more than one network and may include a plurality of different types of networks. Thus, the network 120 may include a plurality of data networks, a plurality of telecommunications networks, a combination of data and telecommunications networks and other like communication systems capable of sending and receiving communication signals.

In operation, the terminal 110 can set a wireless network layer two negative acknowledgement message threshold based on an average fade duration over a given amount of time, an average fade duration over a period, an average fade duration over a frame time, an average fade duration over less than a frame length, an average fade duration over multiple frames, or any other average fade duration. The terminal 110 can receive a number of wireless network layer two negative acknowledgement messages over a given period. The terminal 110 can compare the number of wireless network layer two negative acknowledgement messages to the wireless network layer two negative acknowledgement message threshold. The terminal 110 can request a higher data rate if the number of wireless network layer two negative acknowledgement messages is below the wireless network layer two negative acknowledgement message threshold. The terminal 110 can request a lower data rate if the number of wireless network layer two negative acknowledgement messages is above the wireless network layer two negative acknowledgement message threshold.

The average fade duration (Tz) can be the average time that the signal envelope stays below a given target level Z. The target level Z can be the power level required for a given performance metric such as a bit error rate, a frame error rate, or other performance metric. The average fade duration can impact the number of bits, symbols, packets, or other impacted parameters affected by a deep fade. For example, in a system with bit Tb time, if the probability of bit error is high when z<Z and if Tb<<Tz (, such as a bit time, a packet time, or a signaling time<<Average Fade Duration), then many subsequent bits, symbols, or packets, etc. will be received with a large probability of error. This can cause signaling failures and system outages that will impact overall performance, such as by causing higher dropped call rates.

As a further example for a CDMA1X embodiment, a parameter M can indicate a number of consecutive Radio Link Protocol Negative Acknowledgements (RLP Nacks). An algorithm can check for M before triggering an increase from a standard algorithm rate N to the next more aggressive algorithm rate N+1 for a higher maximum data rate request. Here, the algorithm can track the number of consecutive RLP Nacks. In one example, if no Nacks are received, the algorithm can set the Data Request Rate to N+1. If the number of consecutive RLP Nacks reaches a certain threshold M, then the algorithm can disable N+1 and can take the standard value. This approach can increase the average requested rate, and can avoid negative impacts of other approaches.

A related embodiment can use transition probabilities for the data rate request, which can use a rate transition probability parameter. A Transition Probability (TP) can be assigned to each rate, to affect the probability of increasing it to the next higher rate. For example, a 9.6 rate can have a TP of 80%, which can mean that if a Digital Signal Processor (DSP) output is to request 9.6 kpbs, the modified algorithm can request the next higher rate with a probability of 80%. As a further example, the higher a Reverse Supplemental Channel (R-SCH) rate, the more likely the TP can be lower as shown in Table 1.

TABLE 1

| R- SCH Assignments (kbps) | TP |
|---|---|
| 9.6 | 80% |
| 19.2 | 60% |
| 38.4 | 40% |
| 76.8 | 30% |
| 153.6 | 20% |

Transition probabilities can control how aggressive the wireless data rate adjustment can be. Furthermore, transition probabilities can virtually disable the wireless data rate adjustment to have the device use the legacy mechanisms. A method for setting transition probabilities based on wireless channel metrics can be implemented within a wireless data rate adjustment module. The transition probabilities can be set to dynamically match Radio Channel statistics and give higher probabilities to a desired data rate based on Quality of Service (QoS) settings, based on Radio Frequency (RF) performance metrics, such as Signal-to-Noise Ratio (SNR), based on processing gain, such as for Spread Spectrum systems, based on energy requirements, and/or based on other factors. For example, lower data rates can have higher transition probabilities based on a statistical assumption that the required power levels to reach a desired energy per bit to noise power spectral density ratio (EbNo) setpoint is lower, as compared to higher data rates, where the transition probability can be set at a lower level for the higher data rates.

As an example, once a mobile device, such as the terminal 110, enters an aggressive data rate window, it can call a random number generator function and can compare that value to the transition probability for a given rate, examples of which are shown Table 1. As a specific example, if the regular algorithm indicates 9.6 Kbps should be used, a random number can be generated between 0 and 1. For this example, the transition probability for 9.6 kbps is 80%. If the random number is less than or equal 0.8 than the device can increase the rate. Otherwise the rate can be left unchanged. Setting all the transition probabilities to 0% can effectively disable the algorithm.

Figure 2:
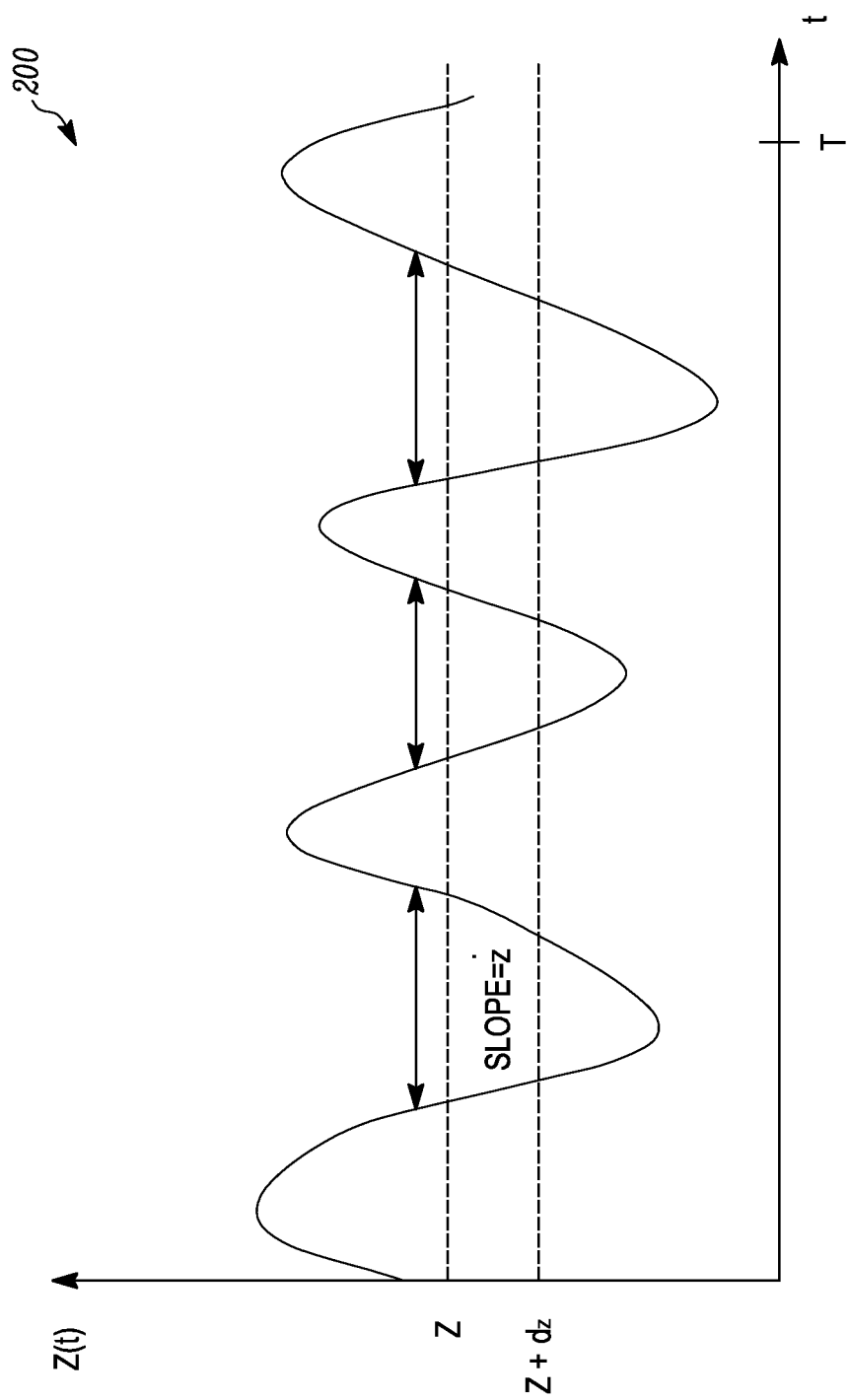
FIG. 2 is an example illustration of a graph showing a level crossing rate according to one possible embodiment.

FIG. 2 is an example illustration of a graph 200 showing a level crossing rate according to one possible embodiment. The graph 200 will be used in describing using average fade duration to calculate N RLP Nacks for a N+1 data rate request. According to this embodiment, an algorithm can use two parameters, the M RLP Nacks threshold and an average fade duration estimation, to set the M parameter. The algorithm can use level crossing rate and average fade duration. The envelope level crossing rate $L_z$ can be defined as the expected rate (in crossing per second) at which the signal envelope crosses the level Z in the downward direction. The expected number of crossings of the envelope level Z per second can be:

$$L_z = \frac{N_z}{T} \int \dot{z} p(Z, \dot{z}) d\dot{z}$$

Where:

$N_z$=expected number of crossing of the envelope level Z with negative slope over the interval [0,T], $\dot{z}$=slope of Z(t) (derivative with respect to time), and $p(Z,\dot{z})$=joint distribution of the signal envelop z(t) and its derivative with respect to time.

The result can apply to any random process, which means it can apply to any fading distribution with known distribution, such as Rician, LogNormal, Rayleigh, or other fading distribution with known distribution. For Rayleigh fading, the level Crossing Lz can simplify to:

$$L_z = \sqrt{2\pi} f_D \rho e^{-\rho^2}$$

Where:

$$f_D = \frac{v}{\lambda} = \text{Doppler}$$

$$\rho = \sqrt{\frac{P_0}{P_r}}$$

$P_0$=Target power level (Target RSSI)
$P_r$=Average power level (Average RSSI)
Where RSSI can be a Received Signal Strength indicator.

The Average Signal Fade Duration $t_z$ can be the average time that the signal envelope stays below a given target level Z. This target level can be obtained from the signal amplitude or power level required for a given performance metric such as a bit error rate. If the signal amplitude or power falls below its target, the system can be in outage.

The Average Signal Fade Duration can be given by:

$$t_z = \frac{p(z(t) < Z)}{L_z}$$

Where:
$p(z(t)<Z)=F_z(z)$=Probability z(t) is less than the target level Z.

The Rayleigh distribution for $p(z(t)<Z)=F_z(z)$ can result in:

$$t_z = \frac{e^{\rho^2} - 1}{\rho f_D \sqrt{2\pi}}$$

The average fade duration can decrease as Doppler shift increases, since, as a channel changes more quickly, it remains below a given fade level for a shorter period of time. The average fade duration can also generally increase with ρ for ρ>>1, because the signal can be more likely to be below the target as the target level increases relative to the average.

The average fade duration can indicate the number of bits, symbols, frames, packets, etc. that can be affected by a deep fade. For example, for a system with bit time $T_b$, if the probability of bit error is high when z<Z, and if $T_b \approx t_z$, then the system can experience single error events, and some form of encoding and interleaving can improve overall system performance. However, If $T_b << t_z$ then many subsequent bits or symbols can be received with z<Z, so large bursts of errors can be likely, which can cause system outage that can impact overall performance. If $T_b >> t_z$ then fading can be integrated over a bit or symbol time in the demodulator and the fading can neglect overage out.

Figure 3:
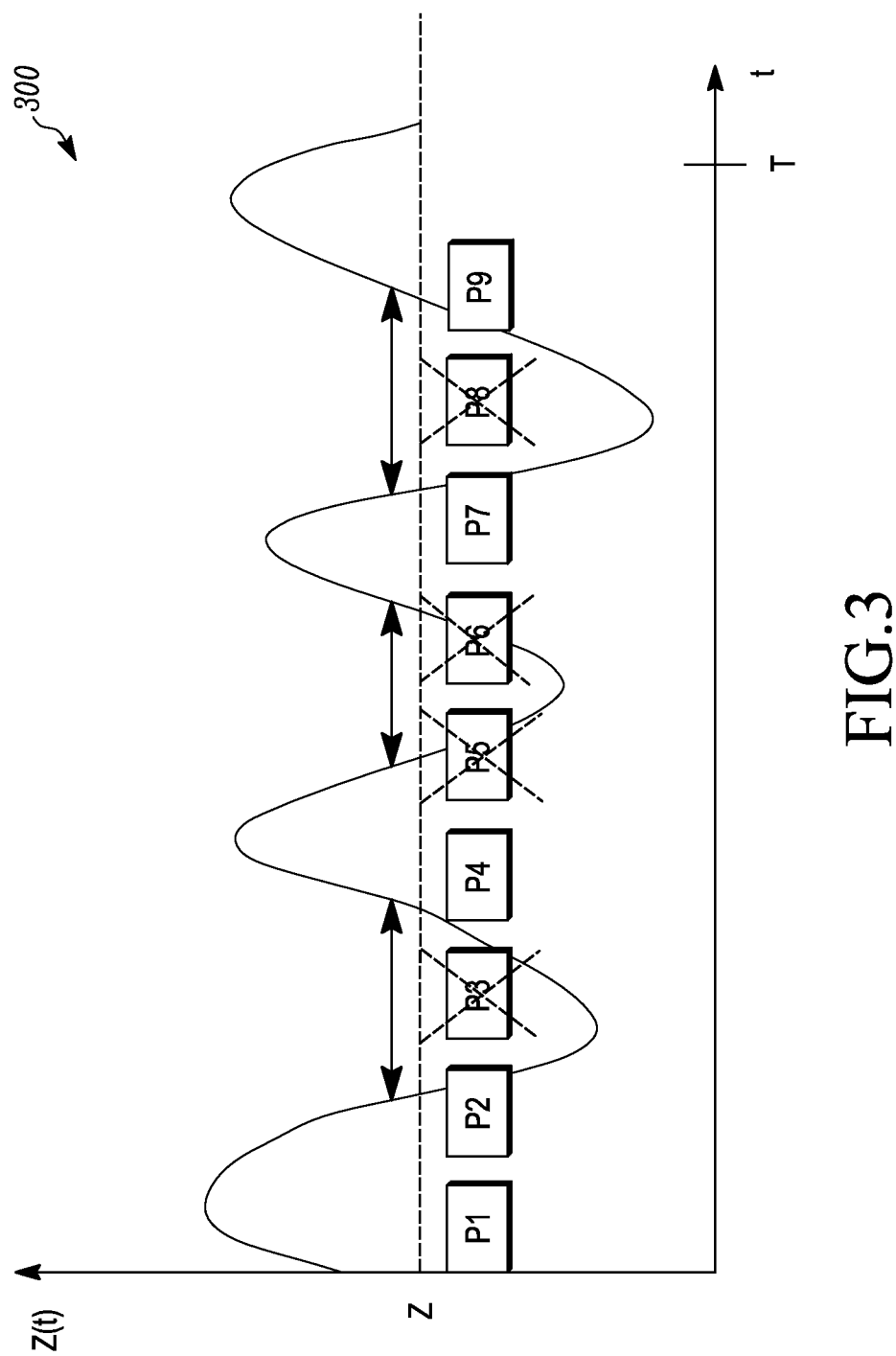
FIG. 3 is an exemplary illustration of a graph showing a case where packets are not received due to fading according to a possible embodiment.

FIG. 3 is an exemplary illustration of a graph showing a case where $T_b << t_z$ where packet 3, 5, 6 and 8 are not received due to fading according to a possible embodiment. This analysis can apply for bits, symbols, frames, packets, etc. Static signaling processing of the radio channel can be used to estimate the number of RLP Frames that may be received in error, which generate a corresponding Nack given an average fade duration estimation. The estimated fade duration can set the number of consecutive RLP Nacks (M) to disable a N+1 rate allocation. The algorithm can be more aggressive outside a deep fading window. The data rate can be increased outside an average fade duration window until radio channel conditions indicate the data rate should be less aggressive due to an increase in Nacks.

For example, a Personal Communication System (PCS) radio channel with Rayleigh fading distribution can have the following parameters:
Velocity=10 km/hr $$f_D = \frac{v}{\lambda} = \text{Doppler} \sim 20 \text{ Hz}$$

$$\rho = \sqrt{\frac{P_0}{P_r}} = 1.5$$

The average fade duration of 200 msec can correspond to 10 1XRTT frames. If M is set to 10, then the algorithm can set the requested data rate to N+1 until 10 consecutive NAcks are received. At this point, the N+1 allocation can be disabled and the algorithm can fall back to the standard rate, until, for example, a multiple of M Acks are received.

A related embodiment can use a trigger mechanism that can be based on statistical knowledge of the radio channel, to estimate the average fade duration (Tz) to determine a non-aggressive window where the probability that a message/packet will require retransmission can be high. The trigger mechanism can be based on a rate Transition Probability (TP). The trigger mechanism can also be based on a Radio Link Protocol (RLP) layer feedback loop that can disable a rate transition if RLP retransmissions exceed a threshold. The method can set the rate Transition Probability (TP), the Aggressive Window (Aw) and a RLP RE_TX (RLP_T) based on Tz and a probability density function for each data rate that considers c current rate provided by DSP functions.

Embodiments can consider the radio channel statistics to set/request data rate increases. Embodiments can also use RLP statistics to control transition to higher data rate requests. Embodiments can use average fade duration channel statistics to estimate an optimum RLP retransmission threshold to trigger a data rate increase. Embodiments can provide a method in a wireless system for increasing a requested upload rate. The embodiments can include using radio channel statistics and average fade duration estimators to set an aggressive window for higher data rate requests. Embodiments can provide a rate transition probability trigger based on an average fade duration. Embodiments can set a trigger mechanism using RLP retransmission feedback. Embodiments can adapt an RLP retransmission threshold based on an average fade duration. Embodiments can be incorporated as a DSP feature in a multi-mode generation modem for IS2000, EVDO, WCDMA and LTE technologies.

Figure 4:
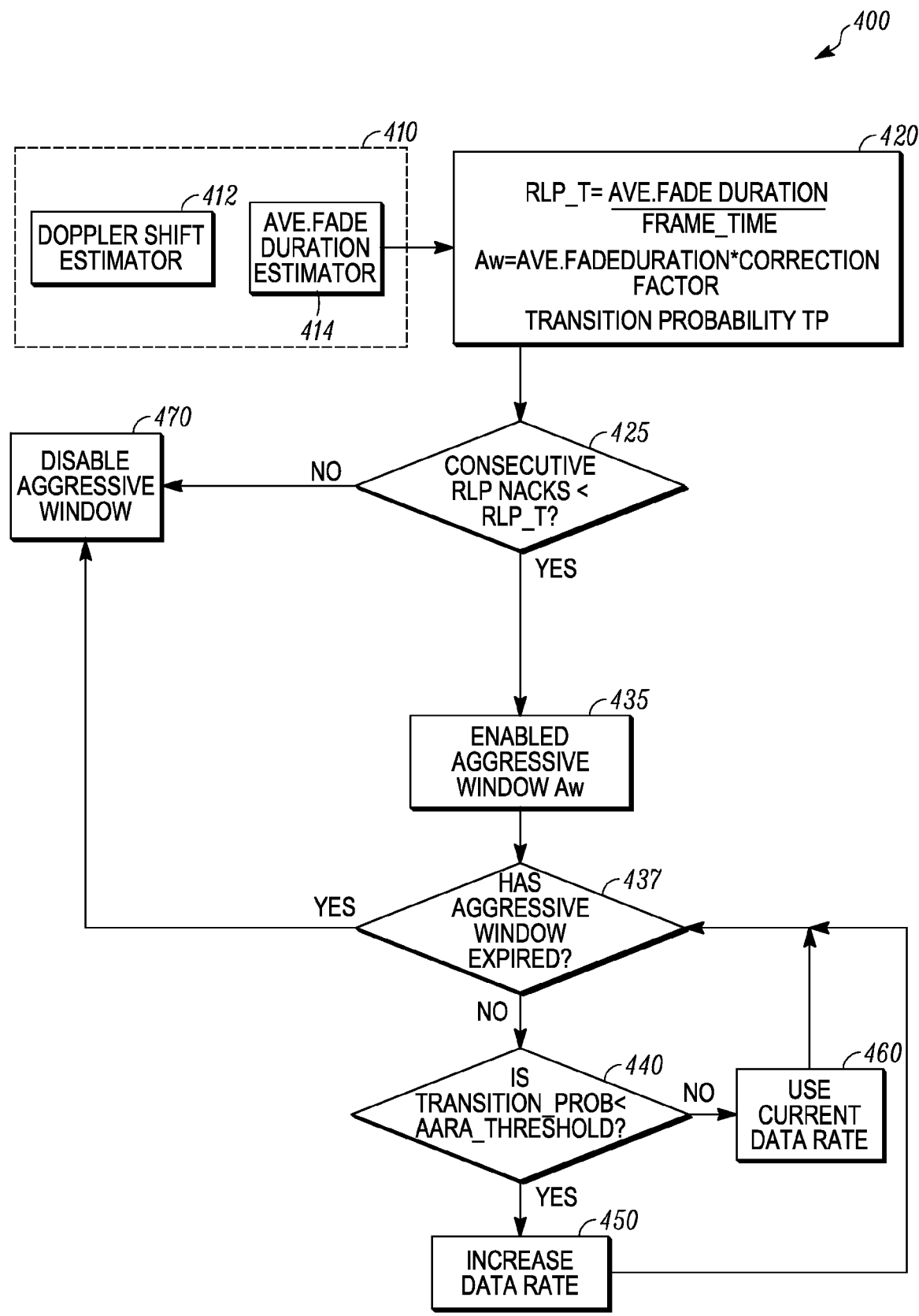
FIG. 4 illustrates an example flowchart illustrating the operation of a wireless terminal according to one possible embodiment.

FIG. 4 illustrates an example flowchart 400 and apparatus 410 illustrating the operation of a wireless terminal according to one possible embodiment. For example, a wireless terminal can include the apparatus 410, which can include a Doppler shift estimator module 412 and an average fade duration estimator module 414. The flowchart 400 can use the output of the Doppler shift estimator 412 and the average fade duration estimator 414.

At 420, a radio link protocol threshold value, RLP_T, can be determined based on an average fade duration divided by a frame time. Also, an adaptive data rate window value, Aw, can be determined based on an average fade duration multiplied by a correlation factor. Additionally, a transition probability, TP, can be determined and set. At 425, a comparison can be made between a number of consecutive RLP Nacks and the threshold RLP_T. If the number of RLP Nacks is less than the threshold, then at 435 the aggressive data rate window, Aw, can be enabled.

At 437, a determination can be made as to whether the aggressive data rate window has expired. If the aggressive rate window has not expired, at 440 a determination can be made as to whether a transition probability value is below an adaptive aggressive rate algorithm (AARA) threshold. For example, the AARA_threshold value can be the transition probability value for a particular rate from Table 1 and the Transition_Prob value can be a probability output from a random number generator. If the Transition_Prob probability is below the threshold, at 450, the data rate can be increased. If the probability is above the threshold, at 460, the data rate can be maintained. For example, a random number generator function can be called and the resulting Transition_Prob value can be compared to the transition probability for a given rate, such as shown in Table 1 for example. As a further example, if the regular algorithm indicates 9.6 Kbps should be used, a random number can be generated between 0 and 1. If the transition probability for 9.6 kbps is 80% and if the random number is less than or equal 0.8, then the rate can be increased at 450. Otherwise the rate can be left unchanged at 460. If all the transition probabilities are set to 0%, then the algorithm can be effectively disabled. After the aggressive data rate window expires at 437 and/or if the consecutive RLP Nacks are above the RLP_T threshold at 425, at 470, the aggressive data rate window can be disabled.

Figure 5:
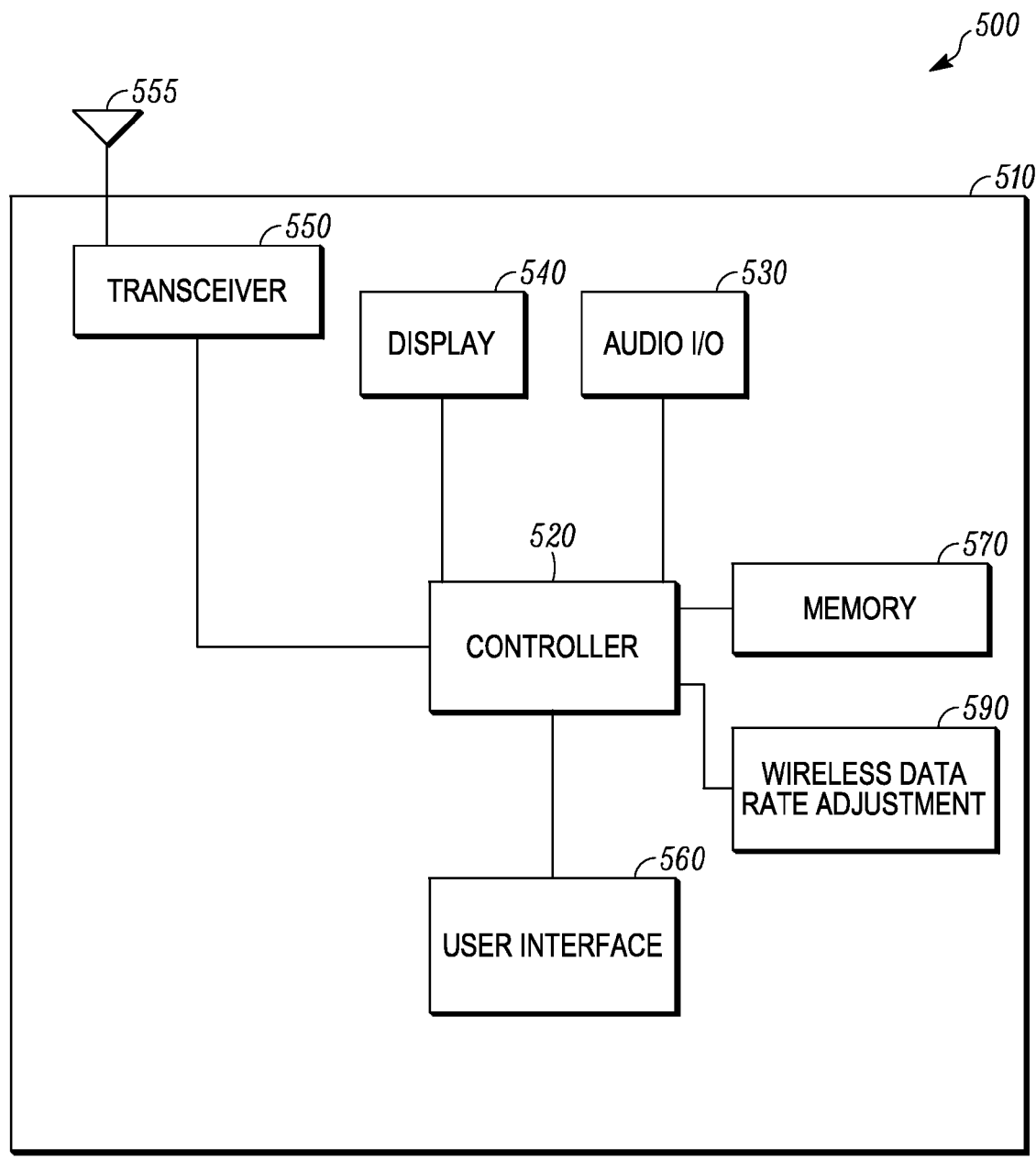
FIG. 5 is an example block diagram of a wireless communication device according to a possible embodiment.

FIG. 5 is an example block diagram of a wireless communication device 500, such as the terminal 110, according to a possible embodiment. The wireless communication device 500 can include a housing 510, a controller 520 located within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, and a memory 570 coupled to the controller 520. The wireless communication device 500 can also include a wireless communication data rate adjustment module 590. The wireless communication data rate adjustment module 590 can be coupled to the controller 520, can reside within the controller 520, can reside within the memory 570, can be an autonomous module, can be software, can be hardware, or can be in any other format useful for a module for a wireless communication device 500.

The display 540 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. The transceiver 550 may include a transmitter and/or a receiver. The audio input and output circuitry 530 can include a microphone, a speaker, a transducer, or any other audio input and output circuitry. The user interface 560 can include a keypad, buttons, a touch pad, a joystick, an additional display, a touch screen display, or any other device useful for providing an interface between a user and an electronic device. The memory 570 can include a random access memory, a read only memory, an optical memory, a subscriber identity module memory, flash memory, or any other memory that can be coupled to a wireless communication device.

In operation, the transceiver 550 can transmit and receive wireless communication signals. The controller 520 can control operations of the wireless communication device 500. The wireless communication data rate adjustment module 590 can set a wireless network layer two negative acknowledgement message threshold based on an average fade duration over a frame time. The layer two can be a data link layer above a layer one physical layer. For example, the layer one can transfer signals between nodes in a network where one layer can provide services to another upper layer while receiving services from a layer below in the Open Systems Interconnection model (OSI model). The frame time can be a length of time for wireless network frames. The average fade duration can be an average time that a signal envelope stays below a target level. The target level can be based on signal amplitude required for a given performance metric. The target level can be based on power level required for a given performance metric. For example, the given performance metric can be a desired bit error rate.

The wireless network layer two negative acknowledgement message threshold, M, can be set based on:

$$M = \text{Ave\_fade\_duration} / \text{frame\_time},$$

where Ave_fade_duration can be an average signal fade duration comprising an average time that a signal envelope stays below a target level, and where frame_time can be a length of time for wireless network frames.

For example, a first value can be "based on" a second value, a formula, an equation, or otherwise based on something by incorporating the second value, incorporating the formula, incorporating the equation, or incorporating whatever the first value is based on into an algorithm, another formula, another equation, other process, or otherwise. The average signal fade duration, Ave_fade_duration, can be set based on (a probability that a signal envelope is less than a target level) divided by (a rate the signal envelope crosses the target level).

The transceiver 550 can receive a number of wireless network layer two negative acknowledgement messages over a given period. For example, the transceiver 550 can transmit wireless communication signals at a given data rate and receive wireless network layer two acknowledgement or negative acknowledgement messages depending on whether the wireless communication signals are correctly received at a base station. The wireless network layer two negative acknowledgement messages can be High Speed Packet Access negative acknowledgement messages. For example, the wireless network layer two negative acknowledgement messages can be cellular network negative acknowledgement messages, Long Term Evolution (LTE) negative acknowledgement messages, Code Division Multiple Access (CDMA) negative acknowledgement messages, CDMA1X negative acknowledgement messages, CDMA2000 negative acknowledgement messages, Wideband CDMA (WCDMA) negative acknowledgement messages, multi-mode generate modem negative acknowledgement messages, Interim Standard-2000 (IS-2000) negative acknowledgement messages, Evolution Data Optimized (EV-DO) negative acknowledgement messages, High Speed Packet Access (HSPA) negative acknowledgement messages, High Speed Uplink Packet Access (HUPA) negative acknowledgement messages, 802.11-based negative acknowledgement messages, or other negative acknowledgement messages.

The wireless communication data rate adjustment module 590 can compare the number of wireless network layer two negative acknowledgement messages to the wireless network layer two negative acknowledgement message threshold.

The wireless communication data rate adjustment module 590 can send a request for a higher data rate if the number of wireless network layer two negative acknowledgement messages is below the wireless network layer two negative acknowledgement message threshold. The data rate can be requested using a channel request message to a radio access network. For example, the channel request message can be a message that asks for a reverse supplemental channel with a defined data rate, can be a supplemental channel request message, or can be any message that asks for a reverse supplemental channel with a desired data rate.

The wireless communication data rate adjustment module 590 can send a request for a lower data rate if the number of wireless network layer two negative acknowledgement messages is above the wireless network layer two negative acknowledgement message threshold. The higher data rate and the lower data rate can be relative to each other. For example, the higher data rate can be higher than the lower data rate and the lower data rate can be lower than the higher data rate.

The wireless communication data rate adjustment module 590 can ascertain a probability of transitioning to a higher data rate for at least one data rate. The higher data rate can be requested with a probability based on the probability of transitioning to a higher data rate from a current data rate.

According to one embodiment, the transceiver 550 can receive a number of consecutive wireless network layer two negative acknowledgement messages. The wireless communication data rate adjustment module 590 can compare the number of consecutive wireless network layer two negative acknowledgement messages to the wireless network layer two negative acknowledgement message threshold. The wireless communication data rate adjustment module 590 can send a request for a higher data rate if the number of consecutive wireless network layer two negative acknowledgement messages is below the wireless network layer two negative acknowledgement message threshold. The wireless communication data rate adjustment module 590 can send a request for a lower data rate if the number of consecutive wireless network layer two negative acknowledgement messages is above the wireless network layer two negative acknowledgement message threshold.

Figure 6:
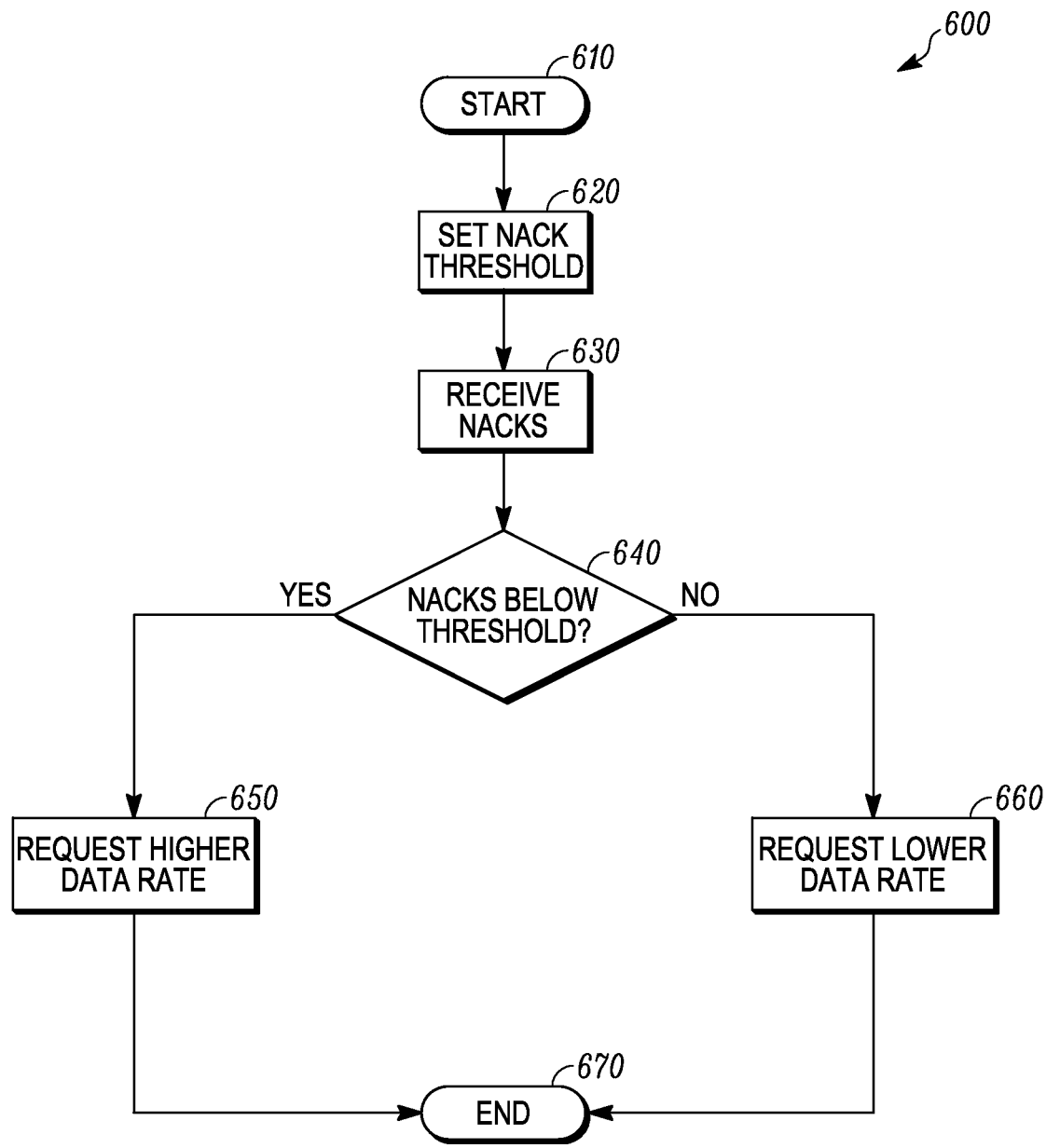
FIG. 6 illustrates an example flowchart illustrating operation of a wireless communication device according to one possible embodiment.

FIG. 6 illustrates an example flowchart 600 illustrating the operation of the wireless communication device 500 according to one possible embodiment. At 610, the flowchart can begin. At 620, a wireless network layer two negative acknowledgement message threshold can be set based on an average fade duration over a frame time. The average fade duration can be an average time that a signal envelope stays below a target level. The target level can be based on signal amplitude required for a given performance metric, can be based on power level required for a given performance metric, or can otherwise be determined.

The wireless network layer two negative acknowledgement message threshold, M, can be set based on:

$$M = \text{Ave\_fade\_duration}/\text{frame\_time},$$

where Ave_fade_duration can be an average signal fade duration including an average time that a signal envelope stays below a target level, and where frame_time can be a length of time for wireless network frames. The average signal fade duration, Ave_fade_duration, can be set based on (a probability that a signal envelope is less than a target level) divided by (a rate the signal envelope crosses the target level).

At 630, a number of wireless network layer two negative acknowledgement messages can be received at a device over a given period. The wireless network layer two negative acknowledgement messages can be High Speed Packet Access negative acknowledgement messages. Receiving can include receiving a number of consecutive wireless network layer two negative acknowledgement messages at a device.

At 640, the number of wireless network layer two negative acknowledgement messages can be compared to the wireless network layer two negative acknowledgement message threshold. At 650, a higher data rate can be requested if the number of wireless network layer two negative acknowledgement messages is below the wireless network layer two negative acknowledgement message threshold. For example, a higher data rate request can be sent to a network entity, such as a base station. The higher data rate can be requested based on a probability of transitioning to a higher data rate from a current data rate. At 660, a lower data rate can be requested if the number of wireless network layer two negative acknowledgement messages is above the wireless network layer two negative acknowledgement message threshold. For example, a lower data rate request can be sent to a network entity, such as a base station. As another example, a lower data rate can be requested by leaving the data rate at a current data rate. Either of the data rates can be requested using, for example, a channel request message to a radio access network. At 670, the flowchart 600 can end.

According to some embodiments, all of the blocks of the flowchart 600 are not necessary. Additionally, the flowchart 600 or blocks of the flowchart 600 may be performed numerous times, such as iteratively. For example, the flowchart 600 may loop back from later blocks to earlier blocks. Furthermore, many of the blocks can be performed concurrently or in parallel processes. Additionally, blocks or the flowchart 600 can be combined with, can replace, or can be replaced by blocks of the flowchart 400.

The methods of this disclosure may be implemented on a programmed processor. However, the operations of the embodiments may also be implemented on non-transitory machine readable storage having stored thereon a computer program having a plurality of code sections that include the blocks illustrated in the flowcharts, or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   setting a wireless network layer two negative acknowledgement message threshold based on an average fade duration over a frame time;
   receiving a number of wireless network layer two negative acknowledgement messages at a device over a given period;
   comparing, at the device, the number of wireless network layer two negative acknowledgement messages to the wireless network layer two negative acknowledgement message threshold;
   requesting a higher data rate if the number of wireless network layer two negative acknowledgement messages is below the wireless network layer two negative acknowledgement message threshold; and
   requesting a lower data rate if the number of wireless network layer two negative acknowledgement messages is above the wireless network layer two negative acknowledgement message threshold,
   wherein the wireless network layer two negative acknowledgement message threshold, M, is set based on: M=Ave_fade_duration/frame_time, where Ave_fade_duration is an average signal fade duration comprising an average time that a signal envelope stays below a target level, and where frame_time is a length of time for wireless network frames.

2. The method according to claim 1, wherein the average fade duration comprises an average time that a signal envelope stays below a target level.

3. The method according to claim 2, wherein the target level is based on signal amplitude required for a given performance metric.

4. The method according to claim 2, wherein the target level is based on power level required for a given performance metric.

5. The method according to claim 1, wherein the data rate is requested using a channel request message to a radio access network.

6. The method according to claim 1, wherein the average signal fade duration, Ave_fade_duration, is set based on (a probability that a signal envelope is less than a target level) divided by (a rate the signal envelope crosses the target level).

7. The method according to claim 1, further comprising ascertaining a probability of transitioning to a higher data rate for at least one data rate,
   wherein the higher data rate is requested with a probability based on the probability of transitioning to a higher data rate from a current data rate.

8. The method according to claim 1, further comprising:
   setting a transition probability threshold for transitioning to a higher data rate for at least one data rate, where the transition probability threshold is set dynamically based on at least one current radio channel operating parameter; and
   comparing a transition probability value to the transition probability threshold,
   wherein the higher data rate is requested based on the results of comparing the transition probability value to the transition probability threshold.

9. The method according to claim 1,
   wherein receiving comprise receiving a number of consecutive wireless network layer two negative acknowledgement messages at the device,
   wherein comparing comprises comparing, at the device, the number of consecutive wireless network layer two negative acknowledgement messages to the wireless network layer two negative acknowledgement message threshold,
   wherein requesting a higher data rate comprises requesting a higher data rate if the number of consecutive wireless network layer two negative acknowledgement messages is below the wireless network layer two negative acknowledgement message threshold; and
   wherein requesting a lower data rate comprises requesting a lower data rate if the number of consecutive wireless network layer two negative acknowledgement messages is above the wireless network layer two negative acknowledgement message threshold.

10. An apparatus comprising:
    a transceiver configured to transmit and receive wireless communication signals;
    a controller coupled to the transceiver, where the controller is configured to control operations of the apparatus; and
    a wireless communication data rate adjustment module stored in a non-transitory computer-readable medium coupled to the controller, the wireless communication data rate adjustment module configured to set a wireless network layer two negative acknowledgement message threshold based on an average fade duration over a frame time, wherein the transceiver is configured to receive a number of wireless network layer two negative acknowledgement messages over a given period, wherein the wireless communication data rate adjustment module is configured to compare the number of wireless network layer two negative acknowledgement messages to the wireless network layer two negative acknowledgement message threshold, configured to send a request for a higher data rate if the number of wireless network layer two negative acknowledgement messages is below the wireless network layer two negative acknowledgement message threshold, and configured to send a request for a lower data rate if the number of wireless network layer two negative acknowledgement messages is above the wireless network layer two negative acknowledgement message threshold;

wherein the wireless network layer two negative acknowledgement message threshold, M, is set based on: M=Ave_fade_duration/frame_time, where Ave_fade_duration is an average signal fade duration comprising an average time that a signal envelope stays below a target level, and where frame_time is a length of time for wireless network frames.

11. The apparatus according to claim 10, wherein the average fade duration comprises an average time that a signal envelope stays below a target level.

12. The apparatus according to claim 11, wherein the target level is based on signal amplitude required for a given performance metric.

13. The apparatus according to claim 11, wherein the target level is based on power level required for a given performance metric.

14. The apparatus according to claim 10, wherein the data rate is requested using a channel request message to a radio access network.

15. The apparatus according to claim 10, wherein the average signal fade duration, Ave_fade_duration, is set based on (a probability that a signal envelope is less than a target level) divided by (a rate the signal envelope crosses the target level).

16. The apparatus according to claim 10,
wherein the wireless communication data rate adjustment module is configured to set a transition probability threshold for transitioning to a higher data rate for at least one data rate, where the transition probability threshold is set dynamically based on at least one current radio channel operating parameter, wherein the wireless communication data rate adjustment module is configured to compare a transition probability value to the transition probability threshold, and wherein the higher data rate is requested based on the results of comparing the transition probability value to the transition probability threshold.

17. The apparatus according to claim 10, wherein the wireless communication data rate adjustment module is configured to ascertain a probability of transitioning to a higher data rate for at least one data rate, wherein the higher data rate is requested with a probability based on the probability of transitioning to a higher data rate from a current data rate.

18. The apparatus according to claim 10, wherein the transceiver is configured to receive a number of consecutive wireless network layer two negative acknowledgement messages, and wherein the wireless communication data rate adjustment module is configured to compare the number of consecutive wireless network layer two negative acknowledgement messages to the wireless network layer two negative acknowledgement message threshold, configured to send a request for a higher data rate if the number of consecutive wireless network layer two negative acknowledgement messages is below the wireless network layer two negative acknowledgement message threshold, and configured to send a request for a lower data rate if the number of consecutive wireless network layer two negative acknowledgement messages is above the wireless network layer two negative acknowledgement message threshold.

* * * * *